United States Patent [19]

Adachi et al.

[11] Patent Number: 4,866,670

[45] Date of Patent: Sep. 12, 1989

[54] PROCESSING METHOD AND PROCESSOR FOR MACHINE TRANSLATION

[75] Inventors: Hisahiro Adachi, Chigasaki; Kimihito Takeda, Odawara; Akira Kumano; Hiroyasu Nogami; Seiji Miike; Shinya Amano; Tsutomu Kawada, all of Yokohama, Japan

[73] Assignee: Kabushiki Kaisha Toshiba, Kawasaki, Japan

[21] Appl. No.: 224,232

[22] Filed: Jul. 25, 1988

Related U.S. Application Data

[63] Continuation of Ser. No. 860,469, May 7, 1986, abandoned.

[30] Foreign Application Priority Data

May 8, 1985 [JP] Japan ................................. 60-96012

[51] Int. Cl.⁴ .............................................. G06F 9/00
[52] U.S. Cl. ................. 364/900; 364/920.4; 364/943; 364/943.43; 364/943.42
[58] Field of Search ................................. 364/200, 900

[56] References Cited

U.S. PATENT DOCUMENTS

| | | | |
|---|---|---|---|
| 4,159,517 | 6/1979 | Paradine et al. | 364/200 |
| 4,412,305 | 10/1983 | Yoshida | 364/900 |
| 4,417,319 | 11/1983 | Morimoto et al. | 364/900 |
| 4,438,505 | 3/1984 | Yanagnuchi et al. | 364/900 |
| 4,460,973 | 7/1984 | Tanimoto et al. | 364/900 |
| 4,468,754 | 8/1984 | Asada et al. | 364/900 |
| 4,475,171 | 10/1984 | Kanou | 364/900 |
| 4,481,601 | 11/1984 | Kobayashi et al. | 364/900 |
| 4,502,128 | 2/1985 | Okajima et al. | 364/900 |
| 4,503,426 | 3/1985 | Mikulski | 340/711 |
| 4,586,160 | 4/1986 | Amano et al. | 364/900 |
| 4,599,612 | 7/1986 | Kaji et al. | 340/709 |
| 4,599,691 | 7/1986 | Sakaki et al. | 364/419 |
| 4,661,924 | 4/1987 | Okamoto et al. | 364/900 |

FOREIGN PATENT DOCUMENTS

| | | | |
|---|---|---|---|
| 081784 | 6/1983 | European Pat. Off. | |
| 0139440 | 10/1979 | Japan | 364/569 |
| 0007583 | 1/1982 | Japan | 364/419 |
| 58-75272 | 5/1983 | Japan | |
| 0114224 | 7/1983 | Japan | 364/419 |
| 01114225 | 7/1983 | Japan | 364/419 |
| 0115947 | 8/1984 | Japan | 364/300 |
| 59-183469 | 10/1984 | Japan | |
| 0200368 | 10/1985 | Japan | 364/419 |
| 0189665 | 8/1986 | Japan | 364/419 |

OTHER PUBLICATIONS

Allen B. Tucker, "A perspective on machine translation; Theory & Practice" communications of the ACA, Apr./84, vol. 27, No. 4, p. 322.

Coulon et al. "A supervised learning technique to identify short natural language sentences", PROC. of the International Joint Conference on Pattern Recognition, Nov. 8–11, 1976, pp. 85–89, IEEE, Long Beach.

Patent Abstracts of Japan, vol. 7, No. 168 (P-212) [1313], Jul. 23, 1983.

Patent Abstracts of Japan, vol. 9, No. 44 (P-337) [1767], Feb. 23, 1985.

*Primary Examiner*—Gareth D. Shaw
*Assistant Examiner*—John G. Mills
*Attorney, Agent, or Firm*—Foley & Lardner, Schwartz, Jeffery, Schwaab, Mack

[57] ABSTRACT

A machine translation processor according to the present invention includes an input section having a keyboard with a partial translation command key, a translation processing section having dictionaries for performing translation of an original sentence, a time measuring section for measuring the actual translation time performed in the translation processing section, a memory for storing both the original and translation sentences, a dividing section for dividing the original sentence into phrases in accordance with a predetermined rule for division, and a control section for controlling the translation of the original sentence such that when the partial translation command key is operated or the actual translation time measured reaches a predetermined maximum translation time, the original is divided into phrases by the dividing section and the phrases are translated by the translation processing section. Overall translation time is reduced by dividing the difficult original sentence into phrases that may easily translated.

8 Claims, 10 Drawing Sheets

| | |
|---|---|
| ☐ THIS TOOL WAS USED<br>☐ TO DEVELOP THE MACHINE<br>☐ IN JAPAN | ■このツールを用いた<br>☐ その機械を開発するため<br>☐ 日本で |
| THIS TOOL WAS USED TO DEVELOP THE MACHINE IN JAPAN. | 日本では そのマシンを開発<br>するために このツールを<br>用いた。 |

FIG. 5A
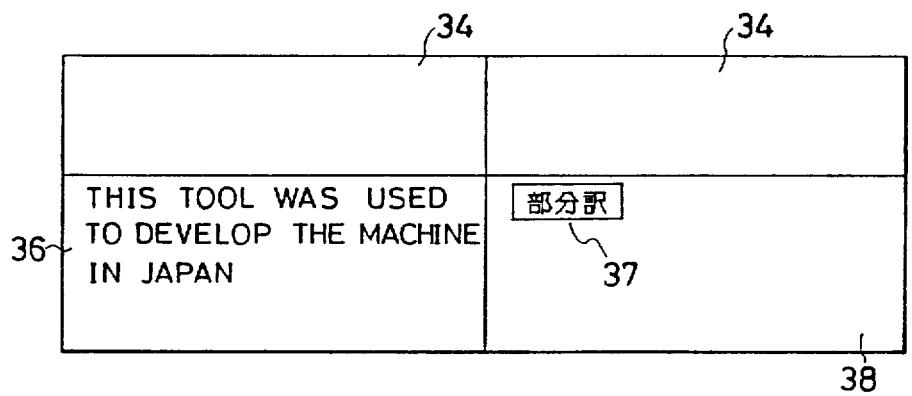
FIG. 5B
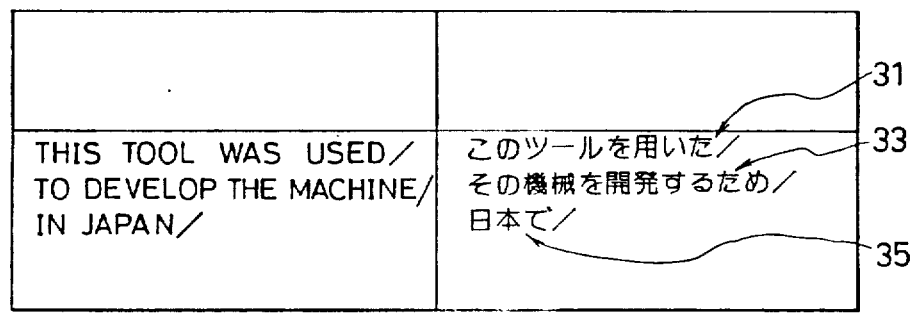
FIG. 5C
| □THIS TOOL WAS USED<br>□TO DEVELOP THE MACHINE<br>□IN JAPAN | □このツールを用いた<br>□その機械を開発するため<br>□日本で |
|---|---|
| THIS TOOL WAS USED<br>TO DEVELOP THE MACHINE<br>IN JAPAN | |

FIG. 5D

| | |
|---|---|
| ☐THIS TOOL WAS USED<br>☐TO DEVELOP THE MACHINE<br>☐IN JAPAN | ☐このツールを用いた<br>☐その機械を開発するため<br>■日本で |
| THIS TOOL WAS USED<br>TO DEVELOP THE MACHINE<br>IN JAPAN | 日本で[は] |

FIG. 5E

| | |
|---|---|
| ☐THIS TOOL WAS USED<br>☐TO DEVELOP THE MACHINE<br>☐IN JAPAN | ☐このツールを用いた<br>■その機械を開発するため<br>☐日本で |
| THIS TOOL WAS USED<br>TO DEVELOP THE MACHINE<br>IN JAPAN | 日本では その[機械]を開発<br>するため |

FIG. 5F

| | |
|---|---|
| ☐THIS TOOL WAS USED<br>☐TO DEVELOP THE MACHINE<br>☐IN JAPAN | ☐このツールを用いた<br>■その機械を開発するため<br>☐日本で |
| THIS TOOL WAS USED<br>TO DEVELOP THE MACHINE<br>IN JAPAN | 日本では その[マシン]を開発<br>するため |

FIG. 5G

| □THIS TOOL WAS USED<br>□TO DEVELOP THE MACHINE<br>□IN JAPAN. | □このツールを用いた<br>■その機械を開発するため<br>□日本で |
|---|---|
| THIS TOOL WAS USED<br>TO DEVELOP THE MACHINE<br>IN JAPAN. | 日本では そのマシンを開発<br>するため▣ |

| □THIS TOOL WAS USED<br>□TO DEVELOP THE MACHINE<br>□IN JAPAN | ■このツールを用いた<br>□その機械を開発するため<br>□日本で |
|---|---|
| THIS TOOL WAS USED<br>TO DEVELOP THE MACHINE<br>IN JAPAN. | 日本では そのマシンを開発<br>するために このツールを<br>用いた。 |

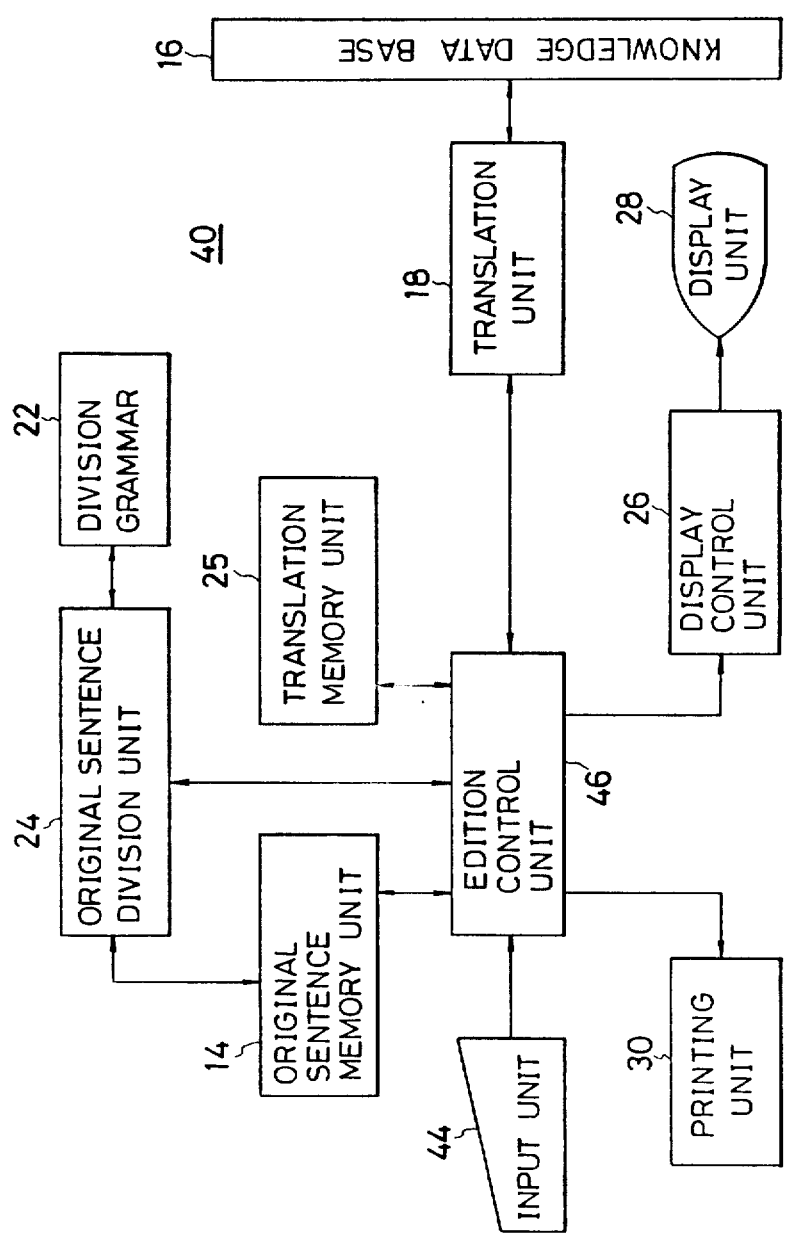

PROCESSING METHOD AND PROCESSOR FOR MACHINE TRANSLATION

This application is a continuation of application Ser. No. 860,469 filed May 7, 1986, now abandoned.

BACKGROUND OF THE INVENTION

1. Field of the Invention

The present invention relates to a processing method and a processor for processing a sentence written in a first natural language (original sentence) to be translated and output as a sentence described in a second natural language (translated sentence).

2. Description of Prior Art

In recent years, automatic translation (machine translation) system by which an English sentence is translated into a Japanese sentence by means of a computer system has been attracting the attention of various people. A translation processor of this kind is composed in such a way as to construct a large-scale data base that is required for the translation processing, and to obtain a high quality product of translation processing by taking full advantage of highly advanced philological and intellectual information processing techniques while retrieving the data base. For this reason, the processing time necessary for translation processing generally takes a relatively long time. That is, a long time period is required between the inputting of an original sentence and obtaining the translated result, the time period being proportional to the degree of complexity of the languages used and the length of the original sentence that is input. A long translation time period is, of course, inconvenient.

This fact leads also to another inconvenience, in a system which performs a conversational translation operation by receiving the response to the translated result while inputting the original sentence, namely, psychological and physical burdens to the operator are increased due to the waiting time for response so that an improvement in the translation processing efficiency cannot be expected.

SUMMARY OF THE INVENTION

An object of the present invention is to provide a processing method and a processor for machine translation which is capable of sharply increasing the efficiency of translation processing.

Another object of the present invention is to provide a processing method and a processor for machine translation which is capable of performing a translation processing in a short time even when there is input a complex original sentence.

Another object of the present invention is to provide a processing method and a processor for machine translation which is capable of obtaining in a short time a complete or a partial translated result for an original sentence input.

One feature of the present invention is a method of performing a machine translation processing, which comprises the steps of: (a) translating an original written in a first language into a second translated language by means of dictionary and grammers, sentence by sentence; (b) measuring actual translation time spent for the translation; (c) determining if the actual translation time thus measured reaches a predetermined translation time; (d) dividing the original sentence or sentences into phrases in accordance with the result of said determination and repeating the translation processing; (e) displaying corresponding translated phrases in the second language on a display; and (f) editing the translated phrases and sentences in the second languages on the display by display control means.

Other feature of the present invention is a machine translation processing method further comprising the step of dividing the original sentence or sentences into phrases and performing a partial translation of the sentence by the operation of a partial translation command key of a keyboard.

Another feature of the present invention is a machine translation processor which comprises: (a) input means for inputting an original written in a first language; (b) translation processing means having dictionaries for performing translation of the original; (c) memory means for storing both the original and translated sentences; (d) time measuring means for measuring actual translation time performed in said translation processing means; (e) dividing means for dividing a sentence into phrases constituting the sentence of the original in accordance with a predetermined rule for division; and (f) control means constructed for controlling such that when the actual translation time reaches a predetermined translation time, the original is divided into phrases by said dividing means and the phrases are translated by said translation processing means.

These and other objects, features and advantages of the present invention will be more apparent from the following description of a preferred embodiment, taken in conjunction with accompanying drawings.

BRIEF DESCRIPTION OF THE DRAWING

FIGS. 5A to 5H are simplified diagrams for illustrating the displayed state of an original sentence and a translated sentence in the processing method shown in FIG. 4;

FIG. 6 is a block diagram for a second embodiment of the machine translation processing in accordance with the present invention;

DESCRIPTION OF THE PREFERRED EMBODIMENTS

Figure 1:
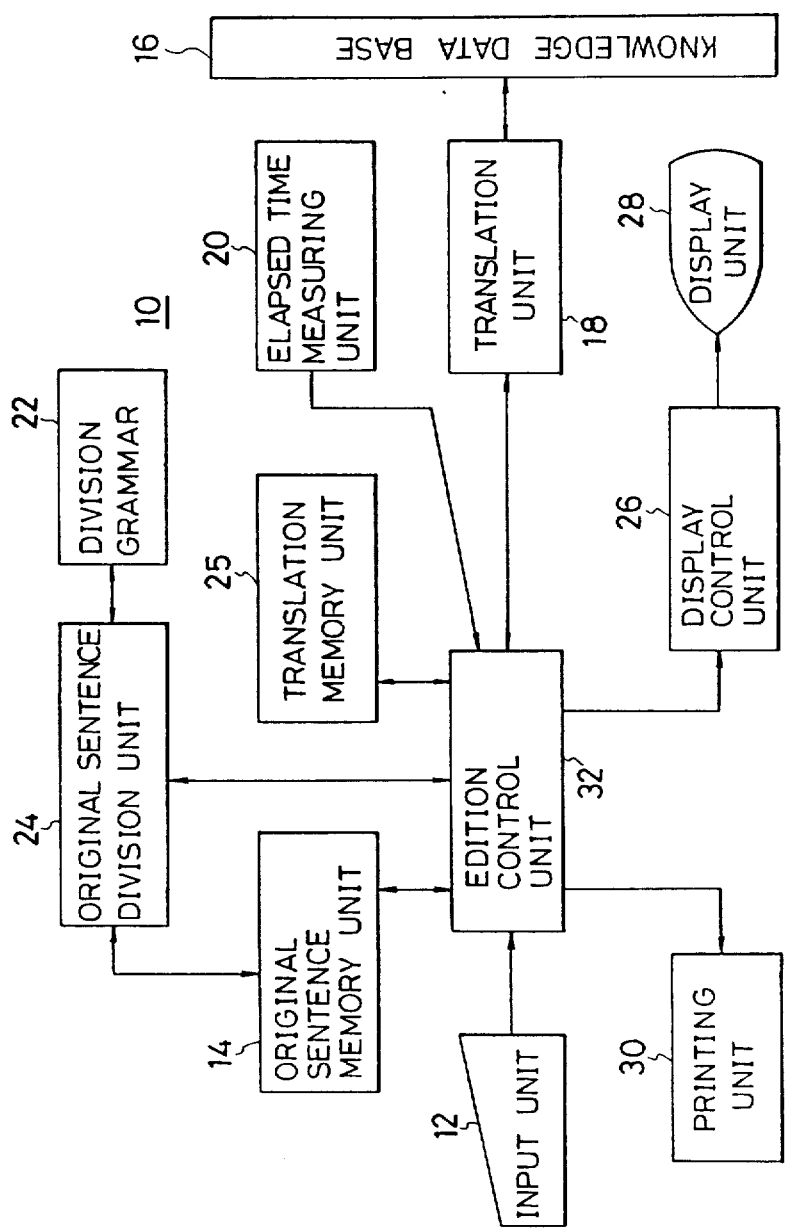
FIG. 1 is a block diagram for an English to Japanese machine translation processor embodying the present invention.
Figure 3:
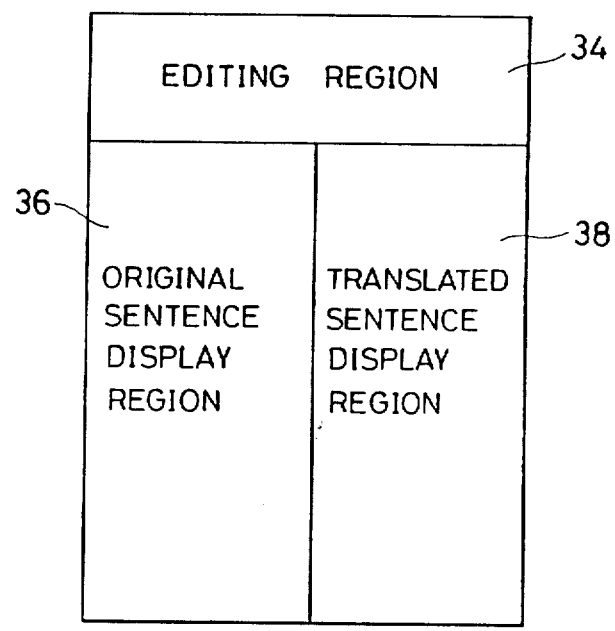
FIG. 3 is a diagram for illustrating the screen composition of the display unit in the device shown in FIG. 1.
Figure 4:
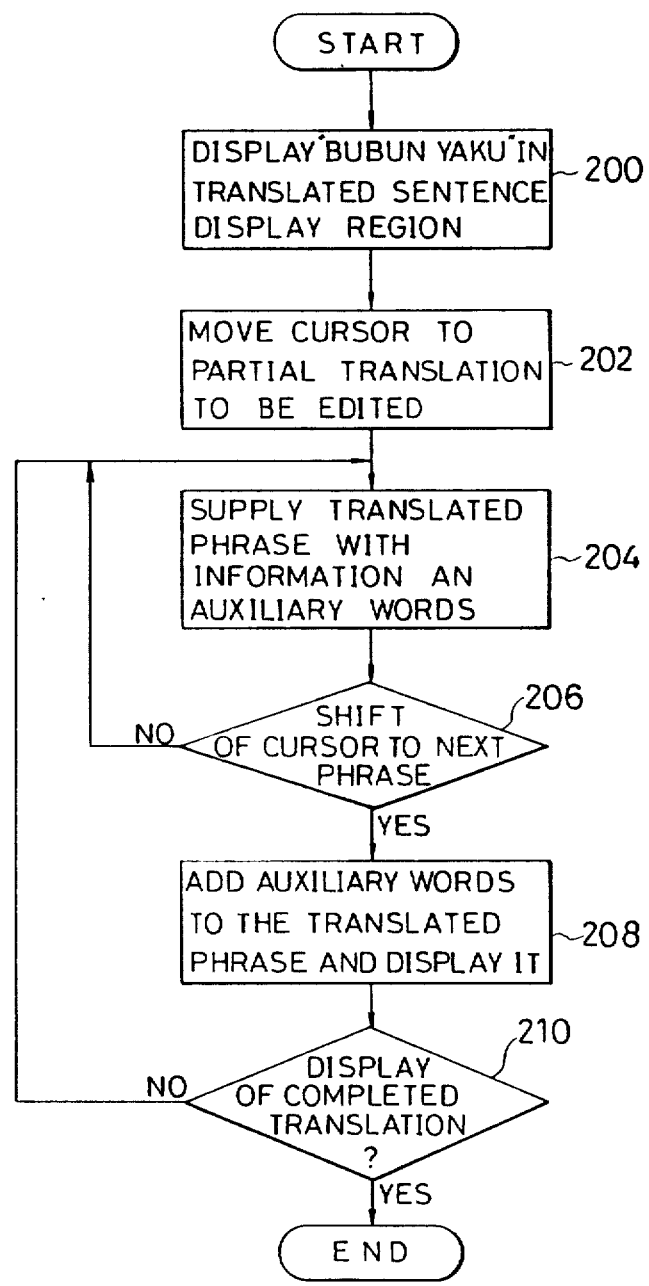
FIG. 4 is a flow chart for illustrating the details of the method of display control processing in the flow chart shown in FIG. 2.

Referring to FIG. 1, a machine translation processor embodying the present invention is shown with reference numeral 10. The machine translation processor 10 for processing an original sentence (English sentence) that is input to be translated into a translated sentence (Japanese sentence), comprises an input unit 12 that consists of a keyboard, an original sentence memory unit 14 for storing the English sentence that is given via the input unit 12, a knowledge data base 16 for storing grammar and translation dictionary, a translation unit 18 for performing translation processing for the original sentence by the use of the grammar and translation dictionary, an elapsed time measuring unit 20 for measuring the processing time of analysis stage in the translation unit 18, an original sentence division unit 24 for processing the original sentence by dividing it by means of a division grammar 22 for performing partial translation processing in the translation unit 18, when the measured time in the elapsed time measuring unit 20 reached a predetermined time, a translation memory unit 25 for storing translated sentence that is translation-processed, a display control unit 26 and a display unit 28 for displaying the translated sentence that is translation-processed, a printing unit 30 for printing translated sentence displayed, and an edition control unit 32 for controlling the translation processing in the translation unit 18 by receiving an original sentence from the input unit 12. Further, the screen of the display unit 28 consists, as shown in FIG. 3, of an editing region 34, an original sentence display region 36, and a translated sentence display region 38.

Figure 2:
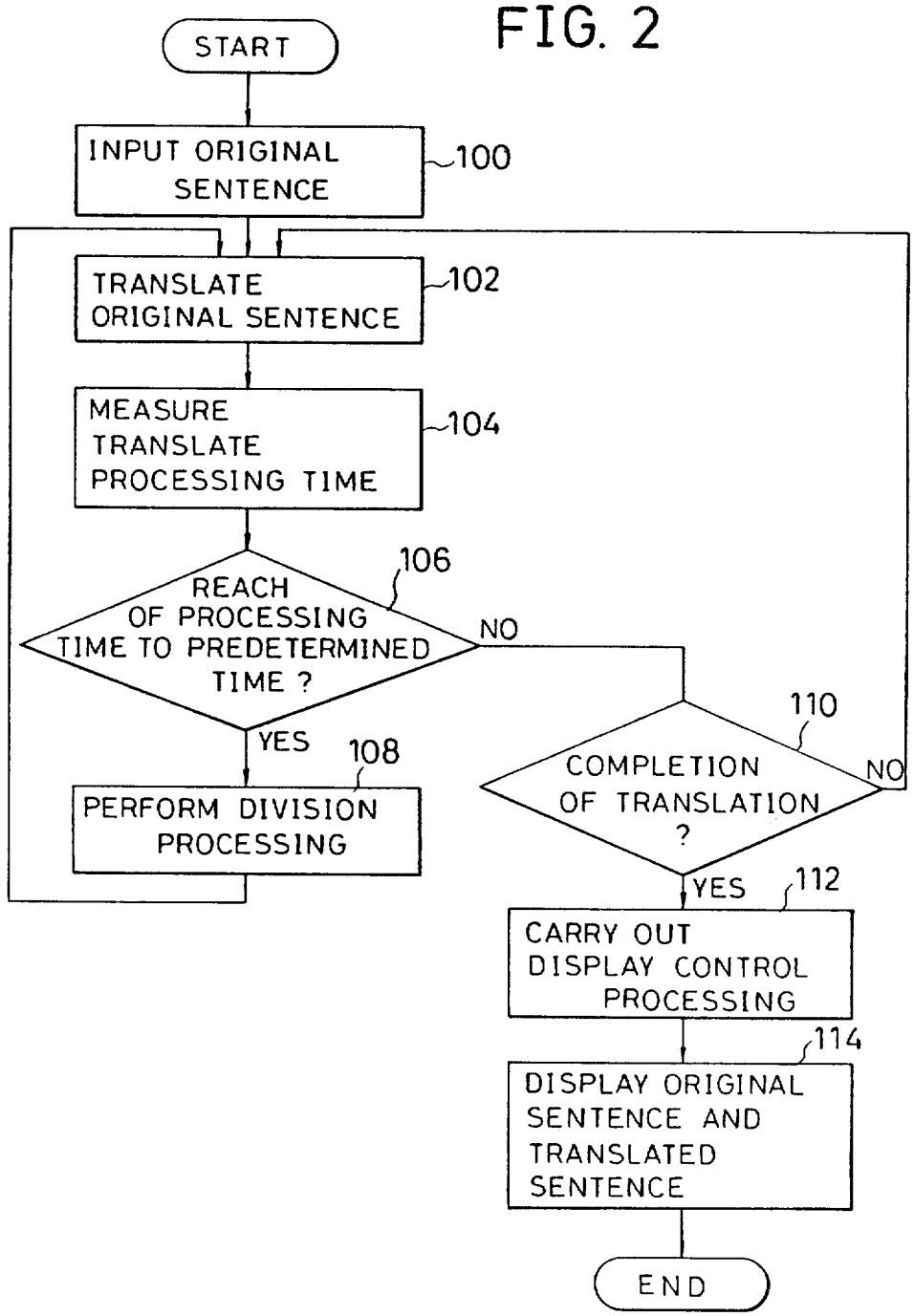
FIG. 2 is a flow chart for illustrating the method of machine translation processing in the device shown in FIG. 1.

Now, referring to FIG. 2, the translation processing method in the machine translation processor 10 will be described.

First, when an original sentence (English sentence) is input to the input unit 12, it is stored in the original sentence memory unit 14 via the edition control unit 32. The stored original sentence is supplied to the translation unit 18 sentence by sentence via the edition control unit 32. (step 100) The separation and feeding of the sentences are carried out, for example, by detecting the period signs or the like in the sequence of input characters. Next, for a piece of sentence that is separated in the translation unit 18, information such as the parts of speech are supplemented to the words that are partitioned by spaces of the like. Further, the construction and the meaning of the sentence are analyzed by the use of the translation dictionary and the translation grammar that are stored in the knowledge data base 16, translated phrase or phrases are added, and transformation, generation, and the like of the construction are carried out, in order to obtain a translated sentence. (step 102) In this case, the processing time for the analysis stage of the translation unit 18 is measured in the elapsed time measuring unit 20. (step 104) The edition control unit 32 judges whether or not the processing time reached the predetermined time. (step 106) If it is found that it reached the predetermined time, the edition control unit 32 interrupts translation processing and sends the original sentence to the original sentence division unit 24. The original sentence division unit 24 performs division processing by the use of the division grammar. (step 108) Namely, when an example of English sentence as shown in FIG. 5A is input, it is divided into elemental units of the sentence "This tool was used", "to develop the machine", and "in Japan" as shown in FIG. 5B. Then, those three phrases are sent to the translation unit 18 via the edition control unit 32, translation processed, and partial translation for each part is obtained. (step 102) Namely, in the case of the above example of sentence, there will be obtained three partial translations as "kono tsuuru o mochiita" 31, "sono kikai o kaihatsu suru tame" 33, and "nippon de" 35 that are composed of hiraganas, Chinese characters (kanjis), and katakanas of Japanese language, as shown in FIG. 5B. Then, in step 110, it is judged whether or not translation is completed.

When translation is completed, the original sentence and the translated sentence are displayed in corresponding manner on the display device 10, under the control of the display control unit 26 (see FIG. 5B). When the translation is partial, display control processing as will be described below is carried out. (step 112) Upon completion of the display control processing, the original sentence and the translated sentence are displayed. (step 114)

Next, referring to FIG. 4 and FIGS. 5A to 5H, the display controller shown in step 112 in FIG. 2 will be described.

When an English sentence is input, the English sentence is displayed in the original sentence display region 36 of the screen as shown in FIG. 5A. If the translation processing is not completed yet at the stage when the translation processing time reached the predetermined time, the words "bubun yaku" 37 in terms of kanjis of Japanese language or "partial translation" in English are displayed in the translated sentence display region 35 as shown in FIG. 5A. (step 200) Then, when the partial translation is displayed in the translated sentence display region 38 as shown in FIG. 5B, the user can readily judge that the displayed translated sentence is not a bona fide translated sentence. Next, under the indication by the user through the keyboard, the partial translation as displayed in the translated sentence display region 38 in the preceding stage, and the corresponding English sentence are displayed in the editing region 34 as shown in FIG. 5C. Then, in order to edit the order of the sentence, the cursor is moved to the position where "nippon de" in Japanese is displayed, and by the indication through the selection key, the translated expression "nippon de" in Japanese is moved and displayed in the translated sentence display region 38, as shown in FIG. 5D. (step 202) Here, if it is desired to insert the particle "wa" 37 in Japanese hiragana which is missing in the translated sentence, by indicating the key for "wa" on the keyboard, instead of the selection key, it will be moved to the translated sentence display region 38 and displayed as "nippon dewa" 39 there, as shown in FIG. 5D. In this manner, the user is able to supplement the translated phrase with information on auxiliary words that are missing, in addition to select a partial translation. (step 204)

In addition, the operation of supplementing missing information can be continued to be input until the cursor on the screen is shifted to a partial translation to be selected next. (step 206) Thus, for example, if the partial translation was "nippon" instead of "nippon de", it is possible to shift the word and display it as "nippon dewa" in the translated sentence display region 38, by indicating two Japanese hiraganas "dewa" through the keyboard and by shifting the cursor. (step 208) Here, the operation of selection, shifting, and displaying for one partial translation will be completed when the cursor is moved in the vertical direction. Further, by shifting the cursor in the horizontal direction, a translated word in the partial translation can be manipulated as follows. For example, by shifting the cursor to "kikai" 41 in FIG. 5E, it is possible to select and change it to another translated word "mashin" 43 through the operation of the selection key, as shown in FIG. 5F, to shift and display the word in the translated sentence display region 38. Moreover, if it is desired to add a Japanese hiragana "ni" 45 which is missing in the translated expression to the end of the translation "suru tame", the word will be shifted and an expression "suru tameni"

will be displayed in the translated sentence display region as shown in FIG. 5G, by indicating "ni" on the keyboard.

By performing the above-mentioned operations, a translated sentence as shown in FIG. 5H becomes possible to be obtained. (step 210) In this way, at the time point when it reaches a predetermined time after inputting of the original sentence, the user is able to obtain a regular translated result or a partial translation. Moreover, in editing the translated sentence by the use of partial translations, it becomes possible to add missing information (particles or the like), change translated words, and others, in addition to the selection of partial translation. Therefore, the psychological and physical burdens to the user become reducible, making it possible to improve sharply the effciency of the translation processing, including the edition efficiency.

Figure 7:
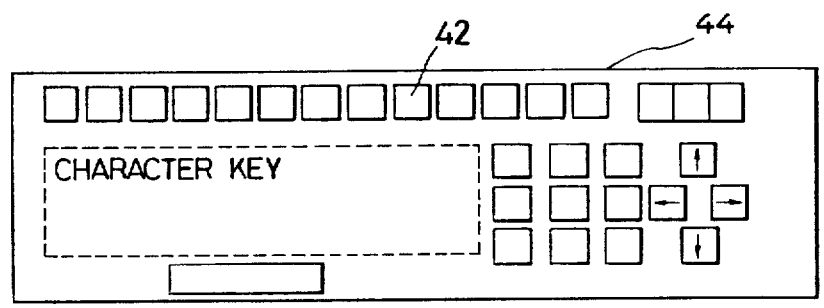
FIG. 7 is a diagram for illustrating the key arrangement of the input unit in the device shown in FIG. 6.

Referring to FIG. 6, a second embodiment of the machine translation processor is shown with reference numeral 40. The machine translation processor 40 is arranged to be switched forcibly to the partial translation processing, through the indication of partial translation by the user. For this purpose, the processor 40 has, as shown in FIG. 7, an input unit 44 that consists of a keyboard that has a partial translation indication key 42, and an edition control unit 46 that interrupts the translation processing in execution and controls it to perform partial translation processing upon striking of the partial translation indication key 42. The other composition, namely, the original sentence memory unit, knowledge data base, translation unit, division grammar, original sentence division unit, translated sentence memory unit, display control unit, display unit, and printing unit are the same as in the first embodiment, so that their description will be omitted by assigning them identical symbols.

Figure 8:
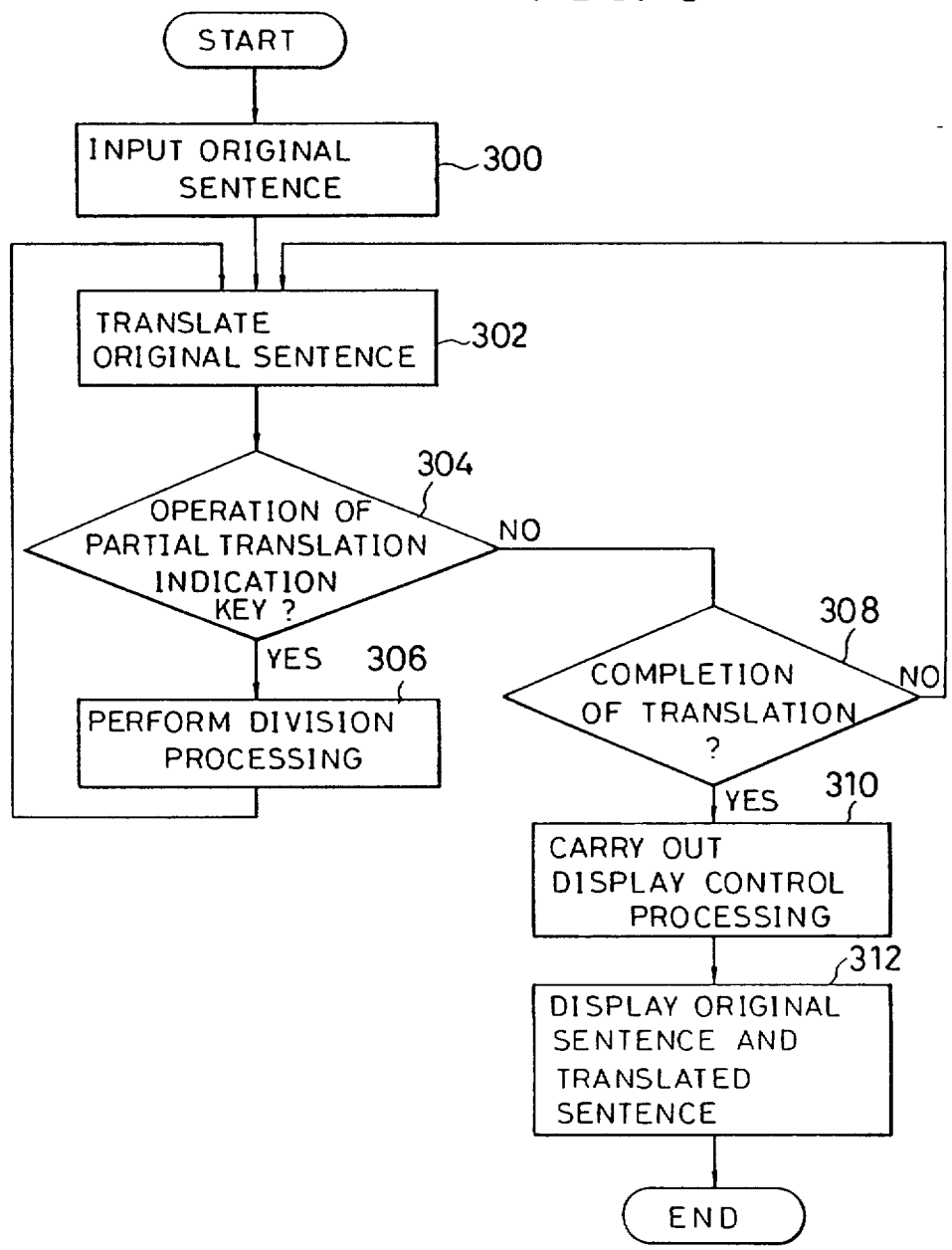
FIG. 8 is a flow chart for illustrating the method of machine translation processing in the device shown in FIG. 6.

Next, referring to FIG. 8, the translation processing method or the device 40 in the second embodiment will be described.

First, when an original sentence (English sentence) is input to the input unit 44, it is stored via the edition control unit 46 in the original sentence memory unit 14. The original sentence stored is supplied via the edition control unit 32 to the translation unit 18 by being separated and sent out sentence by sentence. (step 300) Next, for one sentence that is separated and sent out from the translation unit 18, information such as part of speech is supplemented to each word that is partitioned by spaces or the like, its construction and meaning are analyzed by the use of the translation dictionary and the translation grammar that are stored in the knowledge data base, translation of the words are added, and transformation, generation, and the like of the construction are performed, in order to execute the translation processing. (step 302) Then, whether or not the partial translation indication key 42 on the keyboard 44 is struck is judged. (step 304) When it is judged that the partial translation indication key 42 is struck, the edition control unit 46 interrupts the translation processing that is going on in the translation unit 18, sends the original sentence to the original sentence division unit 24 where division processing is carried out by the use of the division grammar. (step 306) Next, the subdivided sentences are sent via the edition control unit 46 to the translation unit 18 where they are processed and partial translation for each parts are obtained. (step 302) Then, whether or not translation is completed is judged in step 308, and if it is found that the translation is finished, display control processing and display of the original sentence and the translated sentence are carried out similar to the first embodiment. (steps 310 and 312) Here, the display control processing in step 310 is similar to that in the first embodiment so that its detailed description will be omitted.

Furthermore, in the first and second embodiments, description was made in conjunction with a composition which possesses the function for shifting automatically to partial translation processing by measuring the translation processing time and the function for forcibly shifting to partial translation processing under sending of a partial translation indication by the operator. It should be noted that it is quite obvious that a machine translation processor with both functions can readily be realized.

Moreover, in the foregoing embodiments it has been assumed that the original sentence is an English sentence and the translated sentence is a Japanese sentence. However, the present invention is by no means limited to this combination, and it can be applied to combinations of a variety of languages.

In summary, according to the present invention, the contents of translation processing will be changed after elapse of a predetermined translation processing time. Thus, for instance, it becomes possible to output a nearly reliable partial translation result within a time that is small compared with the processing time that is necessary for obtaining a regular translation result.

Accordingly, it becomes possible to reduce sharply the waiting time for the response, from the point in time at which an original sentence was input to the time at which the result of its translation processing is obtained, as well as to obtain the response to the input original sentence in real time. Therefore, significant practical effects such as a reduction in the psychological and physical burdens to the operator can be achieved, through a conspicuous improvement that can be realized in the efficiency of conversational information processing.

Various modifications become possible for those skilled in the art after receiving the teachings of the present disclosure without departing from the scope thereof.

What is claimed is:

1. A method of machine translating an original sentence in a first natural language into a second natural language, which comprises the steps of:
    (a) translating the original sentence in the first natural language into the second translated natural language by means of a translation processor;
    (b) measuring actual translation time spent during the translation of an original sentence and comparing the time thus measured with a predetermined maximum translation time being normally required for finishing the translation of a sentence;
    (c) stopping the translation of the original sentence and dividing the original sentence into phrases when the measured actual translation time reaches the predetermined translation time and the translation of the original sentence has not been completed;
    (d) performing the translation of the divided phrases by means of the translation processor; and
    (e) displaying the corresponding translated phrases in the second language on a display, said divided original phrases being displayed on different lines from one another of said display and said translated phrases also displayed on different lines from one another, said translated phrases displayed adjacent said divided original phrases in a one-to-one correspondence therewith.

2. The method as claimed in claim 1 further comprising the step of editing the translated phrases displayed on the display by the use of an editing means.

3. The method as claimed in claim 2 wherein the step of editing includes the step of inserting additional characters of the second language and changing certain words in the translated phrases displayed on the display.

4. The method as claimed in claim 1 wherein the first language is English and the second language is Japanese.

5. The method as claimed in claim 3 wherein said characters of the second language are Chinese characters (Kanji characters) and Japanese hiragana and katakana characters.

6. A machine translation processor which comprises:
   (a) input means for supplying an original sentence in a first natural language;
   (b) memory means for storing the original sentence and a translation of the original sentence;
   (c) translation processing means having dictionaries for performing the translation of the original sentence into a second natural language;
   (d) time measuring means for measuring actual translation time performed in said translation processing means;
   (e) dividing means for dividing the original sentence stored in said memory means into phrases;
   (f) control means for controlling the translation of the original sentence by said translation processing means, such that when the actual translation time required for translating the original sentence reaches a predetermined maximum translation time, the original sentence is divided into phrases by said dividing means and the phrases are translated by said translation processing means; and
   (g) display means for displaying the divided original phrases and translated phrases, said divided original phrases being displayed on different lines from one another of said display and said translated phrases also displayed on different lines from one another, said translated phrases displayed adjacent said divided original phrases in a one-to-one correspondence therewith.

7. The machine translation processor as claimed in claim 6 wherein said input means comprises a keyboard including a partial translation command key for performing a partial translation and said control means in response to the operation of the partial translation command key causes the original sentence to be divided into phrases by said dividing means, and the phrases then being translated by said translation processing means.

8. The machine translation processor as claimed in claim 6 further comprising editing means for editing the translated phrases displayed on said display means.

* * * * *